(12) United States Patent
Kinugawa et al.

(10) Patent No.: US 9,932,175 B2
(45) Date of Patent: Apr. 3, 2018

(54) ARTICLE TRANSPORT FACILITY

(71) Applicant: Daifuku Co., Ltd., Osaka-shi (JP)

(72) Inventors: Tomotaka Kinugawa, Hinocho (JP); Tadashi Nishikawa, Hinocho (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 15/388,237

(22) Filed: Dec. 22, 2016

(65) Prior Publication Data

US 2017/0183154 A1    Jun. 29, 2017

(30) Foreign Application Priority Data

Dec. 28, 2015 (JP) ................... 2015-256532

(51) Int. Cl.
*G05D 1/02* (2006.01)
*B65G 1/04* (2006.01)

(52) U.S. Cl.
CPC ......... *B65G 1/0457* (2013.01); *G05D 1/0214* (2013.01); *G05D 1/0223* (2013.01); *G05D 2201/0216* (2013.01)

(58) Field of Classification Search
USPC ....................................................... 700/218
See application file for complete search history.

(56) References Cited

U.S. PATENT DOCUMENTS

2008/0051985 A1\* 2/2008 D'Andrea ........ G05B 19/41895
701/410
2012/0083964 A1\* 4/2012 Montemerlo ........ G05D 1/0055
701/26

FOREIGN PATENT DOCUMENTS

JP    2000214928 A    8/2000

\* cited by examiner

*Primary Examiner* — Kyle O Logan
(74) *Attorney, Agent, or Firm* — The Webb Law Firm

(57) ABSTRACT

An article transport facility comprises a plurality of article transport vehicles each of which is configured to travel along a track and to transport an article. Each article transport vehicle includes at least one obstacle detection sensor, each configured to detect an obstacle that exists in at least one detection area defined in a peripheral area of the article transport vehicle. The transport vehicle controller of each article transport vehicle is configured to receive the detection area information from the transport facility controller through wireless communication, and to transmit the received detection area information to at least one of the at least one obstacle detection sensor. Each of the at least one obstacle detection sensor is configured to cause the area information memory to store the transmitted detection area information.

8 Claims, 10 Drawing Sheets

ARTICLE TRANSPORT FACILITY

CROSS-REFERENCE TO RELATED APPLICATION

This application claims priority to Japanese Patent Application No. 2015-256532 filed Dec. 28, 2015, the disclosure of which is hereby incorporated in its entirety by reference.

FIELD OF THE INVENTION

The present invention relates to an article transport facility including a plurality of article transport vehicles each of which is configured to travel along a track and to transport an article.

BACKGROUND

As described in JP Publication of Application No. 2000-214928 (Patent Document 1), in semiconductor substrates processing factories and automated factories with factory automation (FA) systems etc., article transport facilities are in practical use in which articles are transported by article transport vehicles that can travel automatically (autonomously) along tracks. In such facilities, a number of article transport vehicles are commonly used, giving rise to a possibility of physical contacts between the article transport vehicles. In addition, there is a possibility that people and objects may come near the tracks along which the article transport vehicles travel. Therefore, the article transport vehicles of Patent Document 1 have an obstacle detection sensor for detecting obstacles, such as other article transport vehicles, humans, and other objects. In Patent Document 1, object detection sensors for detecting objects and a human detection sensor for detecting humans are mounted in the article transport vehicle. In locations where the object detection sensors become too sensitive, the article transport vehicle turns off the object detection sensors, keeping only the human detection sensor in operation to secure the safety of persons while reducing the occurrences of misdetections of obstacles.

By setting proper detection conditions as described above, obstacles that exist near an article transport vehicle can be detected with proper sensitivity. However, the detection conditions may become no longer proper because of changes in the operation conditions of an article transport facility such as alteration of the layout of a factory, and moving of objects installed near the tracks, etc. Therefore, it is preferable that setting of the detection conditions can be changed flexibly. Generally, such sensors are configured to be capable of being connected to an adjusting device, a computer, etc. through cables. The change in the setting of the detection conditions can be done by connecting such a cable to each sensor, for example. However, sensors for detecting obstacles are mounted in each article transport vehicle; so, when the article transport facility has many article transport vehicles, the total number of the sensors that need to be adjusted increases correspondingly, which leads to a large amount of time required to set the detection conditions for all the sensors.

SUMMARY OF THE INVENTION

In light of the background described above, it is desired that the detection condition of an obstacle detection sensor mounted in each of a plurality of article transport vehicles can be set efficiently.

In one embodiment, an article transport facility provided in light of above is an article transport facility including a plurality of article transport vehicles, each of which is configured to travel along a track and to transport an article by performing an article transport operation for transporting an article, the article transport facility comprises:

a transport facility controller configured to cause each of the plurality of article transport vehicles to perform an article transport operation by providing a transport command to each of the plurality of article transport vehicles through wireless communication;

wherein each of the plurality of article transport vehicles includes:

at least one obstacle detection sensor, each configured to detect an obstacle that exists in at least one detection area defined in a peripheral area of the article transport vehicle;

a transport vehicle controller configured to perform an autonomous control of the article transport operation based on the transport command;

wherein each of the at least one obstacle detection sensor includes an area information memory for storing detection area information on the at least one detection area, wherein the transport vehicle controller is configured to receive the detection area information from the transport facility controller through wireless communication, and to transmit the received detection area information to at least one of the at least one obstacle detection sensor, and wherein the at least one obstacle detection sensor is configured to cause the area information memory to store the transmitted detection area information.

With the arrangement discussed above, the transport facility controller can transmit new detection area information collectively to the plurality of article transport vehicles. New detection area information is transmitted from the transport vehicle controller of each article transport vehicle to each of the at least one obstacle detection sensor provided to each article transport vehicle. And each of the at least one obstacle detection sensor can store that information in its area information memory. Because this makes it possible to update the detection area information in the article transport vehicles in parallel, amount of time required to set the detection conditions for all the sensors would not be significant even when the article transport facility has many article transport vehicles. In other words, with the arrangement described above, the detection condition of at least one obstacle detection sensor mounted in each of a plurality of article transport vehicles can be set efficiently.

Additional features and advantages of the article transport facility will become clear from the following descriptions of the embodiments described with reference to the attached drawings.

DETAILED DESCRIPTION

Figure 1:
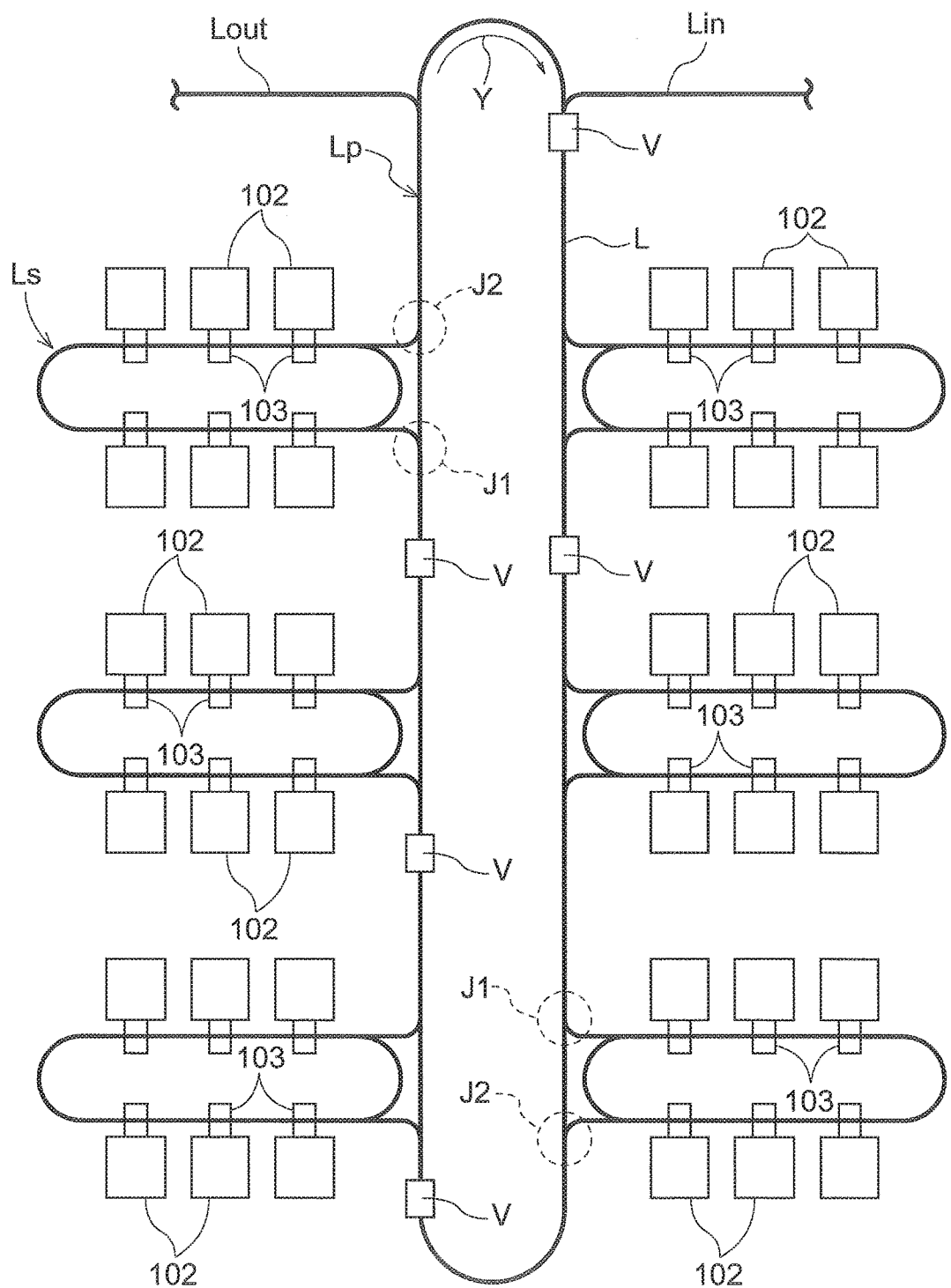
FIG. 1 schematically shows the structure of an article transport facility.
Figure 2:
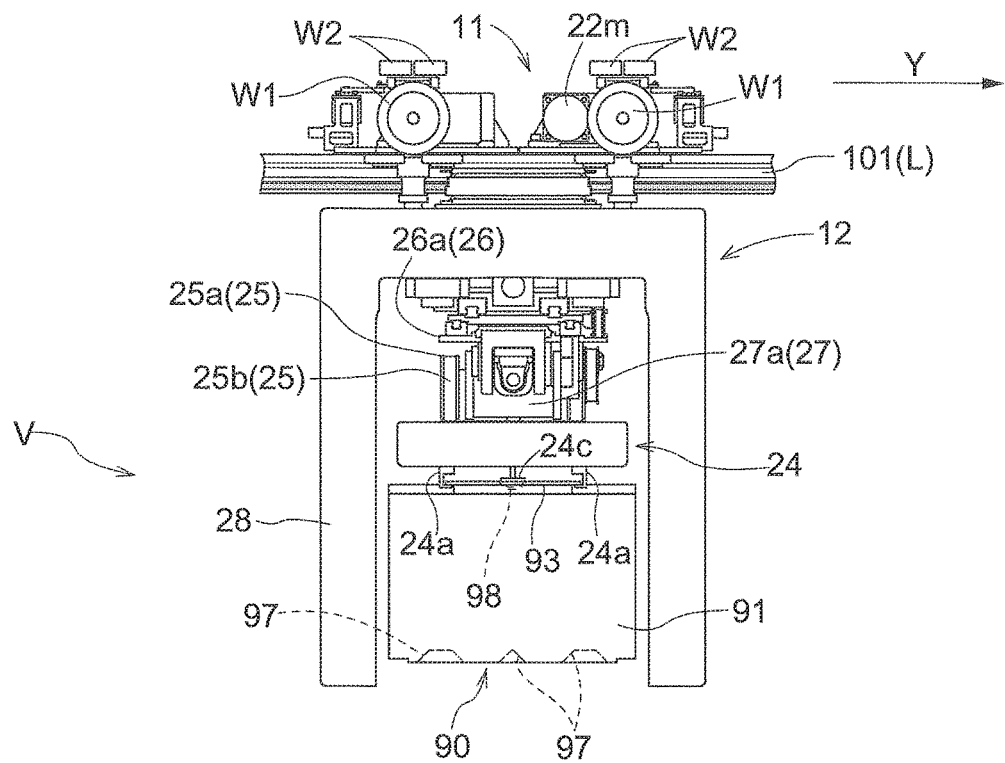
FIG. 2 is a side view of a ceiling transport vehicle.

Embodiments of an article transport facility are described next with reference to the drawings. The present embodiment is described in terms of an example in which an article transport facility 100 including, as shown in FIGS. 1 and 2, ceiling or overhead transport vehicles V (article transport vehicles) each of which is suspended from, and supported by, the travel rails 101 (track which is a course along which transport vehicles V travel) installed to the ceiling, is configured to travel along travel paths L each formed by the travel rails 101, and is configured to transport an article from a transport origin to a transport destination. As shown in FIG. 1, the travel paths L are not formed only by one continuous path, but are formed by a plurality of paths L that are installed one next to another with one connected to another. Therefore, the travel paths L includes branching portions J1 in each of which a path branches off from a path, and merging portions J2 in each of which a path joins another path. Each travel path L is a one-way path (i.e., vehicles are allowed to travel in one direction only along any given path), and each ceiling transport vehicle V travels in the travel direction Y.

Figure 3:
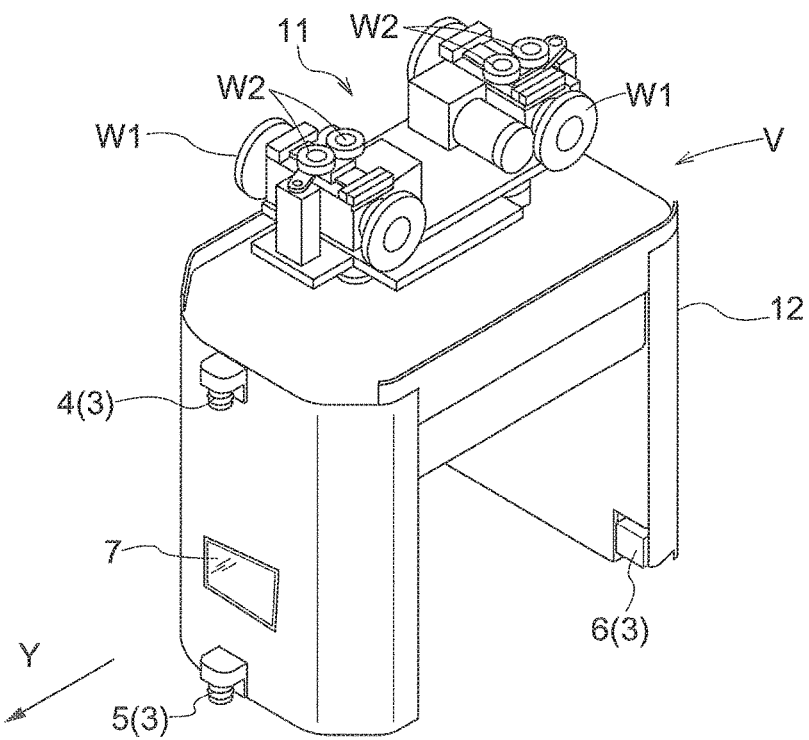
FIG. 3 is a perspective view of the ceiling transport vehicle.
Figure 4:
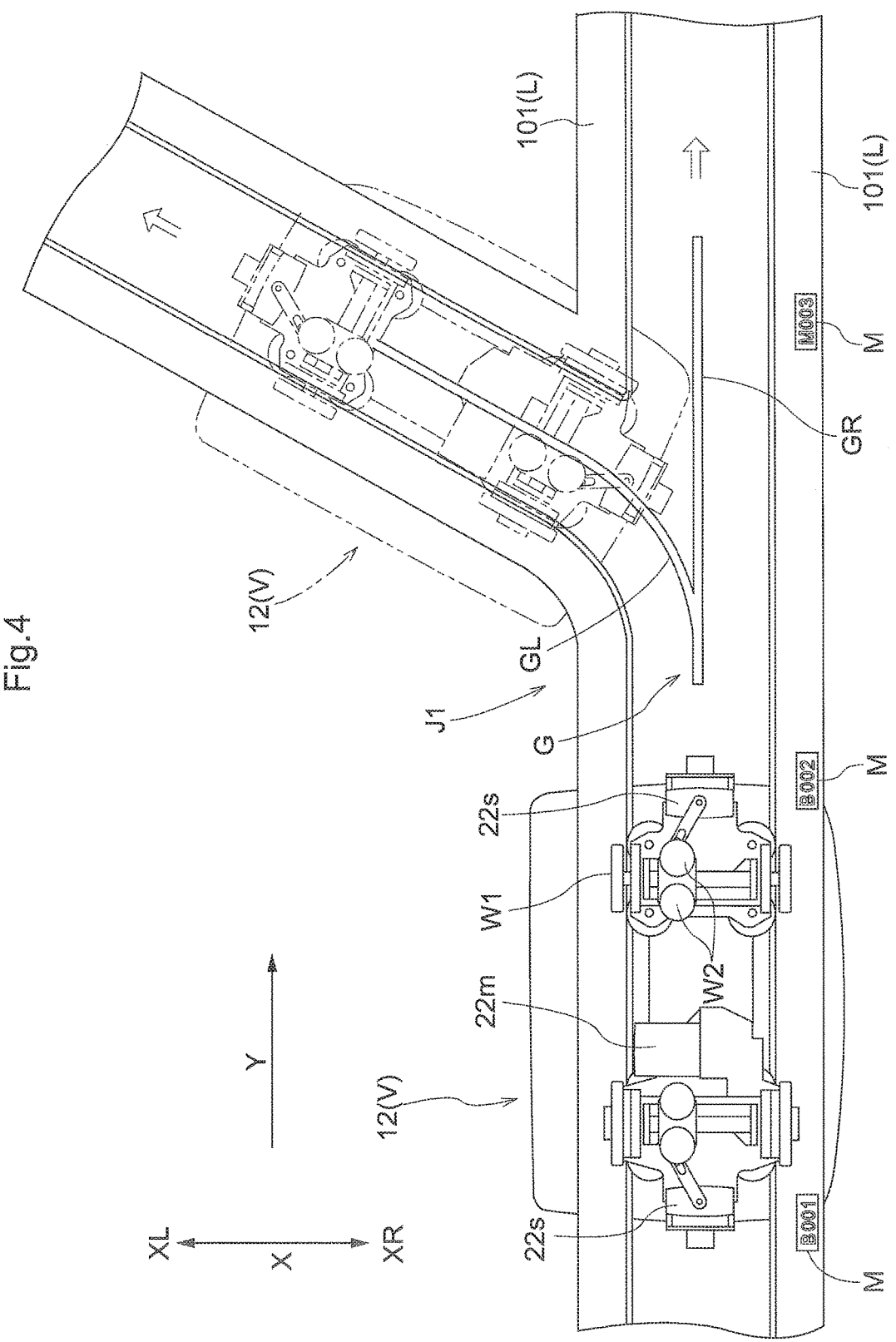
FIG. 4 is an enlarged view of a branching portion.

FIG. 2 is a side view of a ceiling transport vehicle V as seen along a direction ("lateral direction X" described below) that is perpendicular to the travel direction Y. As shown in FIG. 2, the ceiling transport vehicle V has a travel portion 11 having travel wheels W1 which travel or roll on the travel rails 101 suspended from the ceiling, and a main body portion 12 which is suspended from and supported by the travel portion 11. FIG. 3 shows a perspective view of the ceiling transport vehicle V. As described below in detail, as shown in FIG. 3, the ceiling transport vehicle V is provided with obstacle detection sensors 3 each of which is configured to detect an obstacle which may exist in at least one detection area R (see FIG. 8-FIG. 14, etc.) set or defined in an area surrounding (i.e., an peripheral area of) the ceiling transport vehicle V. FIG. 4 is an enlarged view of a branching portion J1 in which a travel path L branches off from another. In the description below, the direction in which a given ceiling transport vehicle V travels will be referred to as the travel direction Y whereas a direction that is perpendicular to the travel direction Y in plan view (i.e., direction that is in the horizontal plane and that is perpendicular to the travel direction Y) will be referred to as a lateral direction X.

Described as an example in the present embodiment is an article transport facility in which articles are transported along the travel paths L between a plurality of semiconductor processing devices (referred to hereinafter as processing devices 102) each of which performs one or more of various processes, such as, thin film formation, photo lithography, etching, etc., on semiconductor substrates. In addition, in the present embodiment, an example is described in which each article transported by the ceiling transport vehicles V is a container 90 (see FIG. 2) called a FOUP (Front Opening Unified Pod) for holding one or more semiconductor substrates. To allow the containers 90 to be transported between any two processing devices 102, a support platform 103 (a platform on which an article is placed) is installed on the floor surface for each processing device 102 with the support platform 103 located adjacent the corresponding processing device 102. Each of these support platforms 103 can be a transport target location (a transport origin and/or a transport destination) for a container 90 being transported by a ceiling transport vehicle V.

The travel paths L includes a relatively large loop-shaped primary path Lp shown in the central portion of FIG. 1 and relatively small loop-shaped secondary paths Ls shown on the outside of the primary path Lp. As shown in FIG. 4, guide rails G are provided in the branching portion J1 which is a portion of a path that branches off from the primary path Lp into a secondary path Ls. In addition, while not shown or described in detail, a similar or identical guide rails G are also provided in a merging portion J2 which is a portion of a path that merges into the primary path Lp from a secondary path Ls. This is true with other branching portions and merging portions (for example, the branching portion and the merging portion between the primary path Lp and the external connection paths (inbound path Lin and outbound path Lout shown in the upper portion of FIG. 1) which are connected to the primary path Lp).

As shown in FIG. 2, each ceiling transport vehicle V has a travel portion 11 configured to travel along a travel path L, and a main body portion 12 which is suspended from, and supported by, the travel portion 11 such that the main body portion 12 is located under the travel rails 101 and which has a support mechanism 24 configured to support a container 90. The travel portion 11 has travel wheels W1 which roll on the travel rails installed along the travel path L, and an electric drive motor 22m for rotating the travel wheels W1.

As shown in FIG. 2, etc., the travel portion 11 is also provided with guide rollers W2 configured to be guided by the guide rails G provided in branching portions J1 and merging portions J2 of a travel path L. The guide rollers W2 are configured to be moved such that their position along a horizontal direction (lateral direction X) can be changed as seen along the direction along the travel direction Y of the travel portion 11. The changing of the position of the guide rollers W2 is performed by the guide roller solenoids 22s (see FIGS. 4 and 5). The guide roller solenoids 22s change the position of the guide rollers W2 to a first position on the right-hand side (right direction XR side) and to a second position on the right-hand side (left direction XL side), as seen toward the front from the back of the travel portion 11 along the travel direction Y, and keep the guide rollers W2 in that position. When in the first position, the guide rollers W2 come into contact with the right-hand side surface of the guide rail G as seen toward the front from the back of the travel portion 11 along the travel direction Y, and guide the travel portion 11 along the guide rail that does not branch off (i.e., along the guide rail that extend on the right-hand side in the travel direction Y (or along the guide rail GR that extend straight forward) relative to the branching side guide rail). When in the second position, the guide rollers W2 come into contact with the left-hand side surface of the guide rail G as seen toward the front from the back of the travel portion 11 along the travel direction Y, and guide the travel portion 11 along the guide rail that veers toward the left-hand side (along the guide rail GL that branches off).

As shown in FIG. 2, the main body portion 12 of the ceiling transport vehicle V has the support mechanism 24 (support portion), a vertical movement actuator 25, a slide actuator 26, a rotating movement actuator 27, and a cover member 28. The support mechanism 24 is a mechanism for suspending and supporting a container 90. The vertical movement actuator 25 is an actuator for vertically moving, i.e. raising and lowering, the support mechanism 24 with respect to the travel portion 11. The slide actuator 26 is an actuator for slidingly moving the support mechanism 24 along the lateral direction X with respect to the travel portion 11. The rotating movement actuator 27 is an actuator for rotating the support mechanism 24 about a vertical axis (an axis (not shown) that extends along the vertical direction) and with respect to the travel portion 11. The cover member 28, as shown in FIG. 2, is a member for covering areas above, and forward and backward along the travel direction Y, of the container 90 when the support mechanism 24 supporting the container 90 is at a set raised position. Note that the set raised position is a position that is specified in advance as a position along the vertical direction (up and down direction) at which the support mechanism 24 is located when the ceiling transport vehicle V travels along the travel rails 101 while supporting an article such as a container 90.

As shown in FIG. 2, the container 90 has a holding portion 91 and a flange portion 93. The flange portion 93 is located in an upper end portion of the container 90, and is a portion supported by the support mechanism 24 of the ceiling transport vehicle V. The holding portion 91 is located below the flange portion 93, and is configured to hold a plurality of semiconductor substrates. Note that a substrate entrance for taking in and out substrates is formed in the front face of the holding portion 91. The container 90 is provided with a lid (not shown) that is capable of closing this substrate entrance and that can be detached from and attached to the container. The ceiling transport vehicle V transports a container 90 with the flange portion 93 suspended and supported by the support mechanism 24.

Figure 5:
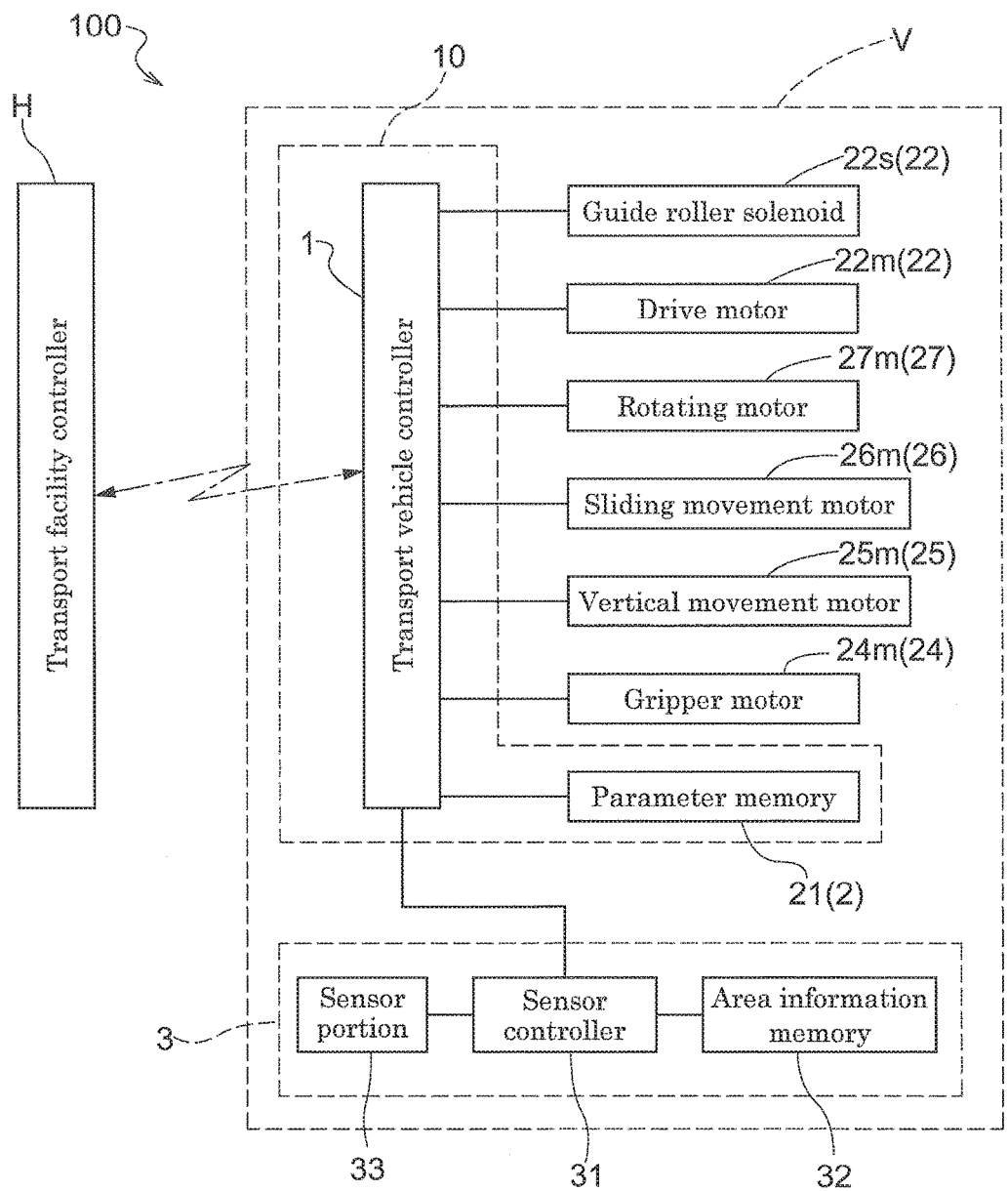
FIG. 5 is a schematic block diagram showing a system configuration of the article transport facility and the ceiling transport vehicle.

The block diagram of FIG. 5 schematically shows a system configuration of the article transport facility and a ceiling transport vehicle. A transport facility controller H is a system controller which serves as a core component of the article transport facility 100. Each of transport facility controller H and other controllers such as the transport vehicle controller 1 includes a CPU and peripheral circuits including a memory circuit and a communication circuit for communicating with various components such as actuators and sensors, and may be a microcomputer, with algorithms in the form of software that is stored and executable by the CPU for performing the required functions disclosed in the present specification. The transport facility controller H is a controller that is superordinate to the ceiling transport vehicles V, and controls the operations of the ceiling transport vehicles V. Each ceiling transport vehicle V performs wireless communication with the transport facility controller H, and operates by an autonomous control (article transport operation) based on a transport command from the controller H to hold and transport an article (container 90). Each ceiling transport vehicle V has a transport vehicle controller 1 which consists of a microcomputer etc., and which serves as the core component for article transport operations. The transport vehicle controller 1 operates the ceiling transport vehicle V by an autonomous control based on transport commands from the transport facility controller H.

The ceiling transport vehicle V (more specifically, its transport vehicle controller 1) which travels autonomously keeps track of the position of the ceiling transport vehicle V along the travel path L. For example, as schematically shown in FIG. 4, coordinate markers M are provided at positions along the travel path L. In addition, a sensor (not shown) for detecting the coordinates markers M is mounted in the ceiling transport vehicle V. In one embodiment, each coordinate marker M is, for example, a two dimensions bar code placed on the top surface of a travel rail 101. In this case, the sensor for detecting the coordinate markers M is a two-dimensional bar code reader that utilizes an area sensor etc., and is preferably provided to the travel portion 11 such that the sensor is directed toward, or faces, the top surface of the travel rail 101. In addition, in another embodiment, each coordinate marker M may be an IC tag that utilizes a short-distance wireless communication IC chip and is preferably placed on, for example, an undersurface of a travel rail 101. In this case, the sensor for detecting the coordinate markers M is an IC tag reader, and is preferably provided to the travel portion 11 such that the sensor is directed toward, or faces, the undersurface of the travel rail 101. The transport vehicle controller 1 recognizes and keeps track of the position along the travel path L by detecting the coordinate markers M with such a sensor. It is preferable that the position is also transmitted to the transport facility controller H as a part of the operation information.

A parameter memory 21 is a storage medium, such as a nonvolatile memory, and stores parameter information that includes position information for transferring containers 90, one container at a time, between a support platform 103 and the ceiling transport vehicle V and for transporting containers 90, one container at a time, between different support platforms 103. The position information includes transport stop target position information and transport movement target position information. The transport stop target position information is information that indicates the target positions (transport stop target positions) at which the travel portion 11 is stopped along the travel rails 101 (travel path L). And the transport movement target position information is information that indicates the target positions (transport movement target positions) to which the support mechanism 24 is moved (through vertical movement, rotational movement, sliding movement; as described in detail below) with respect to the travel portion 11 with the travel portion 11 at rest on the travel rails 101 (travel path L).

The support mechanism 24, which forms a part of the main body portion 12, has a pair of gripping claws 24a (see FIG. 2), and an electric motor 24m for causing the gripping claws to hold or grip an article (gripper motor for short; see FIG. 5). As shown in FIG. 2, each of the gripping claws 24a of the pair is generally formed in an L-shape as seen from a side (as seen along the X-direction). The gripper motor 24m causes the pair of gripping claws 24a to move horizontally away from, and closer to or toward, each other with its actuating force. When the gripping claws 24a of the pair are moved toward each other, the flange portion 93 of a container 90 are supported from below by the lower end portion of each gripping claw 24a (i.e., the gripping claws 24a are in a support state). When the gripping claws 24a of the pair are moved away from each other, the flange portion 93 is no longer supported (i.e., the gripping claws 24a are in a support release state).

Note that a gripper motors 24m may be provided for each gripping claw 24a and that, when an operatively connecting mechanism that operatively connects the gripping claws 24a of the pair is provided, one gripper motor 24m for actuating the operatively connecting mechanism may be provided. In the present embodiment, the pair of gripping claws 24a are assumed to be operated in an operatively connected manner by one gripper motor 24m. The pair of gripping claws 24a can be caused to support the flange portion 93 of the container 90, for example, by causing the gripping claws 24a of the pair to move toward each other by the gripper motor 24m. Alternatively, arrangements may be made such that the gripping claws 24a may be supported by a common pivot shaft (not shown) for rotation about the common pivot shaft and such that the distal end portions of the gripping claws 24a of the pair are pivoted toward each other by the gripper motor 24m to support the flange portion 93.

As shown in FIG. 2, the support mechanism 24 is supported for vertical movement with respect to the travel portion 11 by a vertical movement actuator 25 which also forms a part of the main body portion 12 as with the support mechanism 24. The vertical movement actuator 25 has winding members 25a, belt-shaped members 25b to be spooled and fed-out (or spool belts for short), and an electrical motor 25m for causing vertical movement (or vertical movement motor 25m for short; see FIG. 5). (The term "belt-shaped" means an elongate shape whose lateral width is greater than its thickness.) The winding members 25a are supported by the rotation portion 27a described below. The spool belts 25b are spooled onto respective winding members 25a, and have distal end portions that are connected to the support mechanism 24. The vertical movement motor 25m provides the power for rotating the winding members 25a. In the vertical movement actuator 25, the winding members 25a can be rotated in a forward direction and an opposite direction by the vertical movement motor 25m to spool and feed out the spool belts 25b. This causes the support mechanism 24 and the container 90 supported by the support mechanism 24 to be vertically moved.

The slide actuator 26, which similarly forms a part of the main body portion 12, has a relay portion 26a (see FIG. 2), and an electric motor 26m for causing a sliding movement (a sliding movement motor 26m for short; see FIG. 5). The relay portion 26a is supported by the travel portion 11 for sliding movement along the lateral direction X with respect to the travel portion 11. The sliding movement motor 26m provides the power for causing the relay portion 26a to slide along the lateral direction X. The slide actuator 26 moves the support mechanism 24 and the vertical movement actuator 25 along the lateral direction X by causing the relay portion 26a to slide along the lateral direction X by the actuating action of the sliding movement motor 26m.

The rotating movement actuator 27 which similarly forms a part of the main body portion 12 has a rotation portion 27a (see FIG. 2), and an electric motor 27m for causing rotation (or rotating motor 27m for short; see FIG. 5). The rotation portion 27a is supported by the relay portion 26a for rotation about a vertical axis. The rotating motor 27a provides the power for rotating the rotation portion 27a about the vertical axis. The rotating movement actuator 27 rotates the support mechanism 24 and the vertical movement actuator 25 about the vertical axis by rotating the rotation portion 27a by the actuating action of the rotating motor 27m.

The transport vehicle controller 1 performs a transport control based on a transport command from the transport facility controller H which is a superordinate controller. And this causes the ceiling transport vehicle V to perform an article transport operation. The transport vehicle controller 1 performs a drive control of the various actuators provided in the ceiling transport vehicle V when performing the transport control. The transport control is described next. The transport control is a control for transporting a container 90 from the support platform 103 that is the transport origin to the support platform 103 that is the transport destination by receiving a container 90 from the support platform 103 that is the transport origin, and by delivering the container 90 to the support platform 103 that is the transport destination. And the operation of the ceiling transport vehicle V that accompanies the execution of this transport control is an article transport operation. The transport vehicle controller 1 performs a receiving travel process, a receiving vertical movement process, a delivering travel process, and a delivering vertical movement process in that order in response to a transport command for transporting a container 90 from the support platform 103 of transport origin to the support platform 103 of the transport destination.

In the receiving travel process, the transport vehicle controller 1 performs the transport control based on the transport stop target position information for the support platform 103 specified as the transport origin. The transport stop target position information is information about the target position (transport stop target position) at which the ceiling transport vehicle V (or more specifically, the travel portion 11) is stopped along the travel rails 101 (travel path L). The transport vehicle controller 1 controls the drive motor 22m to cause the travel portion 11 to travel to the transport stop target position for the support platform 103 of transport origin, and to cause the travel portion 11 to stop at the transport stop target position.

In the receiving vertical movement process, the transport vehicle controller 1 performs the transport control based on the transport movement target position information for the support platform 103 of transport origin. And the transport movement target position information is information about the target position (transport movement target position) to which the support mechanism 24 is moved (through vertical movement, rotational movement, sliding movement) with respect to the travel portion 11 when the ceiling transport vehicle V at rest at the transport stop target position transfers a container 90 between the main body portion 12 and a support platform 103 (i.e., receives a container 90 from, or delivers a container 90 to, a support platform 103). After moving the support mechanism 24 to the transport movement target position, the transport vehicle controller 1 causes the gripping claws 24a to be moved toward each other to "closer-together positions" and subsequently, causes the support mechanism 24 to be moved to the position for traveling (or travel purpose position for short i.e., the set raised position). The transport vehicle controller 1 controls the vertical movement motor 25m, the sliding movement motor 26m, and the rotating motor 27m, etc. The result of this is that the container 90 that has previously been supported by the support platform 103 of transport origin is now suspended and supported by the support mechanism 24 located at the travel purpose position.

In the delivering travel process, the transport vehicle controller 1 causes the travel portion 11 to travel to the transport stop target position based on the transport stop target position information for the support platform 103 specified as the transport destination. The transport vehicle controller 1 controls the drive motor 22m to cause the travel portion 11 to travel with the container 90 suspended and to cause the travel portion 11 at the transport stop target position.

In the delivering vertical movement process, the transport vehicle controller 1 causes the support mechanism 24 to be moved to the transport movement target position based on the transport movement target position information for the support platform 103 of the transport destination, and subsequently causes the gripping claws 24a to be moved away from each other to "away positions". The transport vehicle controller 1 controls the vertical movement motor 25m, the sliding movement motor 26m, and the rotating motor 27m, etc. The result of this is that the container 90 that has previously been supported by the support mechanism 24 is now supported by the support platform 103 of the transport destination. Subsequently, the transport vehicle controller 1 controls the vertical movement motor 25m, the sliding movement motor 26m, and the rotating motor 27m, etc. to cause the support mechanism 24 to be moved to the travel purpose position.

Figure 6:
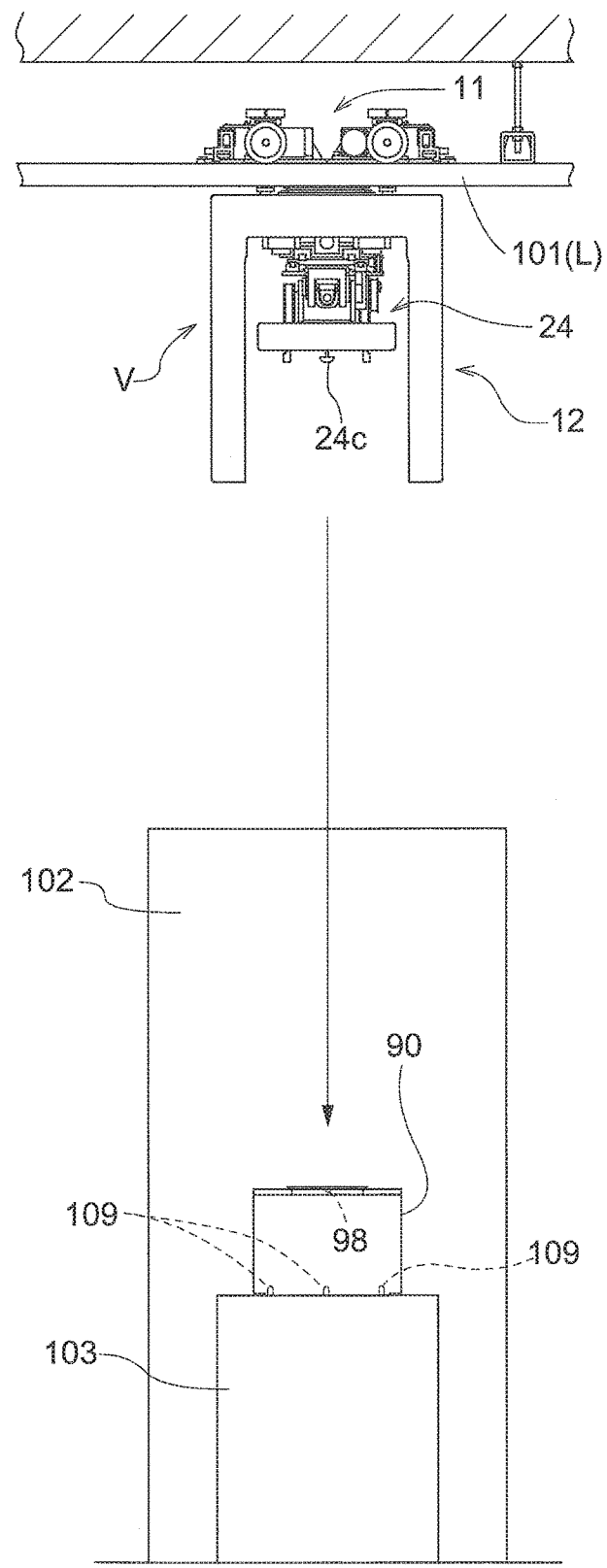
FIG. 6 is a drawing for explaining how an article is transferred by the ceiling transport vehicle.

Incidentally, as shown in FIG. 2, a top surface recess 98 that is recessed downward and is generally conical in shape is formed in the top surface of the flange portion 93 (i.e., top surface of the container 90). The top surface recess 98 is formed such that it tapers toward its lower end so that the inward surface of the top surface recess 98 forms a sloped surface. The top surface recess 98 is configured such that a pressing portion 24c provided to the support mechanism 24 engages the top surface recess 98 from above when the support mechanism 24 is lowered as shown in FIG. 6. For example, when the ceiling transport vehicle V lowers the support mechanism 24 in the receiving vertical movement process, the support mechanism 24 may be horizontally displaced with respect to the container 90 received and supported by the support platform 103. Even if that happens, the pressing portion 24c comes into contact with, and is thus guided by, the inner surface of the top surface recess 98; thus, the support mechanism 24 is guided along the horizontal direction to a suitable position for the container 90.

In addition, as shown in FIG. 2, three bottom surface recesses 97 each in the form of a groove that is recessed upward are provided or formed in the bottom surface of the holding portion 91 (i.e., the bottom surface of the container 90). These three bottom surface recesses 97 are formed such that the longitudinal directions of the bottom surface recesses 97 extend radially away from a bottom surface reference position which is at the center. Each of the three bottom surface recesses 97 is formed such that it tapers toward its upper end so that the inward surfaces of each bottom surface recess 97 are sloped surfaces. The bottom surface recesses 97 are so located that the positioning members 109 provided to the support platform 103 engage respective bottom surface recesses 97 from below when the container 90 is placed on the support platform 103 of the transport destination as shown in FIG. 6. For example, when the support mechanism 24 is lowered to transfer the container 90 to the support platform 103 in the delivering vertical movement process, the container 90 may be horizontally displaced with respect to a proper support position for the support platform 103. Even if that happens, the positioning members 109 come into contact with the inner surface of the bottom surface recesses 97 and thus move the container 90 horizontally; thus, the horizontal position of the container 90 is corrected to a suitable supporting position for the support platform 103.

Incidentally, as shown in FIG. 1, a plurality of ceiling transport vehicles V are provided in the article transport facility 100 and they perform article transport operations by autonomous control simultaneously. Therefore, there is a possibility that a ceiling transport vehicle V may crash from behind into a ceiling transport vehicle V traveling along the track in front of it. In addition, when certain objects (including humans) enter the article transport facility 100, or when locations of devices (which are a kind of objects) in the article transport facility 100 are changed, there is a possibility that a ceiling transport vehicle V performing a traveling process or a ceiling transport vehicle V performing a vertical movement process may come into contact with those objects. In order to prevent such rear-end collisions and contacts, each ceiling transport vehicle V is provided with obstacle detection sensors 3 as described above.

In the present embodiment, an example arrangement is described in which three kinds of obstacle detection sensors 3 are provided to each ceiling transport vehicle V. The obstacle detection sensor 3 for detecting a ceiling transport vehicle V that is traveling in front ("the preceding ceiling transport vehicle") along the track is a rear-end collision prevention sensor 4. The preceding ceiling transport vehicle V as seen by the rear-end collision prevention sensor 4 is an obstacle. The rear-end collision prevention sensor 4 is a distance sensor which utilizes a Laser radar or Lidar etc., for example, and measures the distance between the preceding ceiling transport vehicle V and the ceiling transport vehicle V that the sensor 4 is mounted in. The obstacle detection sensor 3 for detecting objects (obstacles) that exist on, and in an area surrounding (i.e., a peripheral area of), a track and that hinder the traveling of a ceiling transport vehicle V that travels along the track is a travel obstacle detection sensor 5. The obstacle detection sensor 3 for detecting objects (obstacles) that the support mechanism 24 and a container 90 supported by the support mechanism 24 may come into contact with during their vertical movement is a transfer obstacle detection sensor 6. The travel obstacle detection sensor 5 and the transfer obstacle detection sensor 6 are scanner type range sensors (Laser range scanners or sensors), for example, and sweep infrared light, laser, etc. across their field of vision to detect objects (obstacles).

Figure 7:
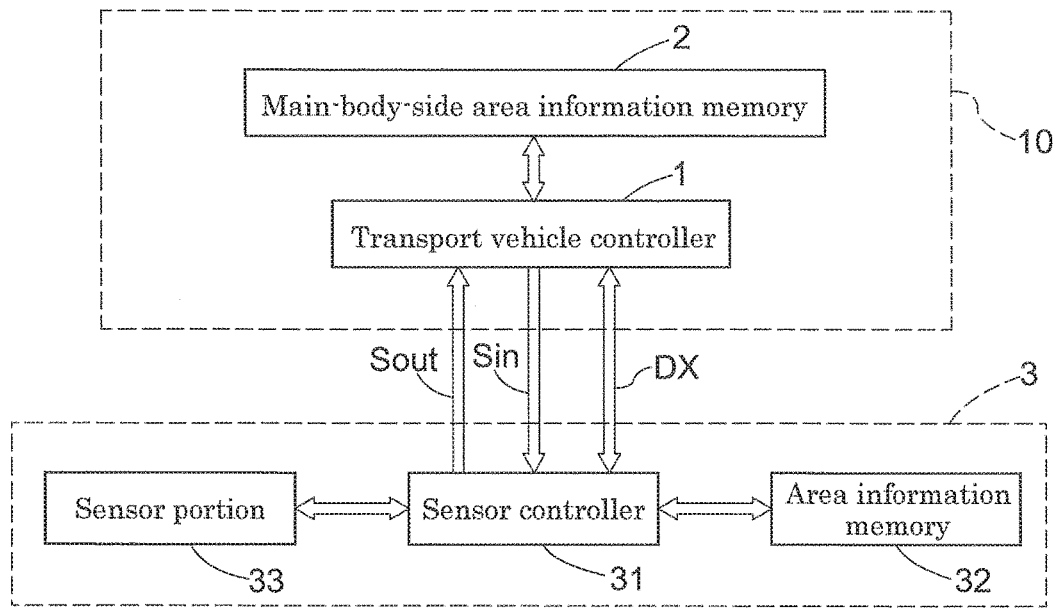
FIG. 7 is a schematic block diagram showing the relationship between a main circuit board of the ceiling transport vehicle, and an obstacle detection sensor.

As shown in FIG. 3, the obstacle detection sensors 3 (4, 5, 6) are installed on an outer surface of the ceiling transport vehicle V, and on an inner wall such that it is directed toward outside through the opening. In addition, as shown in FIGS. 5 and 7, the transport vehicle controller 1 and the parameter memory 21, etc., are mounted on the main circuit board 10 of the ceiling transport vehicle V. And the main circuit board 10 and the obstacle detection sensors 3 are connected to each other by one or more signal lines.

The rear-end collision prevention sensor 4 outputs obstacle detection information (preceding vehicle detection information), if it detects that another ceiling transport vehicle V (preceding vehicle) exists within a preset distance (within a detection area) ahead along the track. The obstacle detection information preferably includes information indicating the distance to the preceding vehicle (which may be information that indicates whether or not the preceding vehicle is within a preset distance (set inter-vehicle distance)). The transport vehicle controller 1 performs an avoidance process based on the obstacle detection information. For example, the transport vehicle controller 1 performs a reduced speed process for causing the ceiling transport vehicle V to travel at a reduced travel speed, when the inter-vehicle distance to the preceding vehicle is less than the set inter-vehicle distance. As one embodiment, if the inter-vehicle distance to the preceding vehicle is less than a stop inter-vehicle distance which is set to be less than the set inter-vehicle distance, the transport vehicle controller 1 may perform a vehicle stopping process for stopping the ceiling transport vehicle V, as the avoidance process. Note that the vehicle stopping process may also be called a stop operation for stopping the traveling of the ceiling transport vehicle V that is performing a traveling process (which may be a receiving travel process, a delivering travel process, or a traveling process for the sole purpose of traveling to any destination).

If the state of the inter-vehicle distance to the preceding vehicle being less than the set inter-vehicle distance is resolved before a predetermined time period (referred to as a set proximity period or set avoidance period)) elapses, the transport vehicle controller 1 causes the article transport operation by the ceiling transport vehicle V to resume at a normal travel speed. If the state of the inter-vehicle distance to the preceding vehicle being less than the set inter-vehicle distance continues for a period of time equal to, or longer than, the set proximity period, the transport vehicle controller 1 performs an error handling process to stop the article transport operation by the ceiling transport vehicle V.

The travel obstacle detection sensor 5 outputs obstacle detection information (travel obstacle detection information), if it detects that an object (obstacle) exists in a predetermined area (i.e., within the detection area) ahead of the ceiling transport vehicle V. The obstacle detection information preferably includes information on the position of the obstacle (which may be information that identifies one of the subdivided areas (divided areas described below) of the detection area)). The transport vehicle controller 1 performs an avoidance process based on obstacle detection information. For example, the transport vehicle controller 1 performs the reduced speed process for causing the ceiling transport vehicle V to travel at a reduced travel speed, when an obstacle is detected in the detection area. As one embodiment, if it is detected that an obstacle exists at a position (first divided area described below) within the detection area in which the presence of the obstacle has a relatively great relevance to the traveling of the ceiling transport vehicle V, the transport vehicle controller 1 may perform a vehicle stopping process (stop operation) for stopping the ceiling transport vehicle V, as the avoidance process.

If the state of an obstacle being detected within the detection area is resolved before a predetermined time period (referred to as a set detection period or set avoidance period)) elapses, the transport vehicle controller 1 causes the article transport operation by the ceiling transport vehicle V to resume at a normal travel speed. If the state of an obstacle being detected within the detection area continues for a period of time equal to, or longer than, the set detection period, the transport vehicle controller 1 performs an error handling process to stop the article transport operation by the ceiling transport vehicle V.

The transfer obstacle detection sensor 6 outputs obstacle detection information (transfer obstacle detection information), if it detects that an object (obstacle) exists within a predetermined area (i.e. within the detection area) in the area through which the support mechanism 24 alone or the support mechanism 24 together with the container 90 supported by the support mechanism 24 is/are vertically moved. The avoidance process, restoration from the avoidance process, and the error handling process, etc., performed by the transport vehicle controller 1 in connection with the transfer obstacle detection sensor 6 are similar or identical to those described above in connection with the rear-end collision prevention sensor 4 and the travel obstacle detection sensor 5, etc.; thus detailed description of these processes are omitted here. Note that when a ceiling transport vehicle V performs a transfer process which may be either a receiving vertical movement process or a delivering vertical movement process, for example, the ceiling transport vehicle V is not traveling but is at rest at a transport stop target position. Therefore, the vehicle stopping process (stop operation) in the avoidance process based on the detection result from the transfer obstacle detection sensor 6 is not a vehicle stopping process done by stopping the drive motor 22*m* during its operation. In this vehicle stopping process, the transport control is suspended by stopping the gripper motor 24*m*, the vertical movement motor 25*m*, the sliding movement motor 26*m*, and the rotating motor 27*m*, etc., to stop the transfer process and to cause the ceiling transport vehicle V to be at rest at the transport stop target position. The same is true with the reduced speed process.

The detection areas of the obstacle detection sensors 3 are stored in area information memory 32 as shown, for example, in FIGS. 5 and 7 in which only one of the three obstacle detection sensors 3 is shown. This area information memory 32 may be a volatile storage medium (volatile memory, such as DRAM etc.), or may be a non-volatile storage medium (non-volatile memory, such as SRAM and a flash memory etc.). Obstacles that may exist near a ceiling transport vehicle V can be detected with proper sensitivity by properly setting the detection areas (detection condition) for each obstacle detection sensor 3. However, the detection areas may become no longer proper because of changes in the operation conditions of the article transport facility 100 such as alteration of the layout of the factory, and moving of objects installed near the tracks, etc. Therefore, it is preferable that the detection areas can be changed flexibly. Generally, such sensors are configured to be capable of being connected to an adjusting device, a computer, etc. through cables. The changes in the detection conditions can be made by connecting such a cable to each obstacle detection sensor, for example. However, as in the present embodiment, obstacle detection sensors 3 are mounted in each article transport vehicle V; so, when the article transport facility has many article transport vehicles V, a large amount of time is required to set the detection areas (detection conditions) for all the sensors. Especially when the article transport vehicle are ceiling or overhead transport vehicles V, it is necessary to work on the ceiling transport vehicles V located at elevated heights, which requires preparation of a stepladder, or a work platform, etc.

To address this issue, in the present embodiment, each transport vehicle controller 1 receives detection area information for updating purposes from the transport facility controller H through wireless communication. And the transport vehicle controller 1 transmits the received detection area information to the obstacle detection sensors 3. Each obstacle detection sensor 3 stores the detection area information transmitted from the transport vehicle controller 1 in the area information memory 32. As shown in FIG. 7, the transport vehicle controller 1 and the sensor controller 31 of each obstacle detection sensor 3 are connected through serial communication signal line DX. The transport vehicle controller 1 and each sensor controller 31 perform two-way communication in accordance with a serial telecommunications standard. The detection area information which the transport vehicle controller 1 received is transmitted to each obstacle detection sensor 3 through the serial communication signal line DX. And the sensor controller 31 stores the transmitted detection area in the area information memory 32.

With this arrangement, new and updated detection area information is transmitted at once from the transport facility controller H to each ceiling transport vehicle V. And the transport vehicle controller 1 of each ceiling transport vehicle V that received the new detection area information transmits the new detection area information to the obstacle detection sensors 3 provided to each ceiling transport vehicle V. Because the updating of the detection area information in the ceiling transport vehicles V can be performed in parallel, the amount of time required to set detection area information can be shortened even if the article transport facility 100 has many ceiling transport vehicles V.

Note that, as shown in FIG. 7, the detection area information for updating that is transmitted from the transport facility controller H through wireless communication is first stored in the main-body-side area information memory 2. This main-body-side area information memory 2 may be a volatile storage medium (volatile memory, such as DRAM etc.), or may be a non-volatile storage medium (non-volatile memory, such as SRAM and a flash memory etc.). When the main-body-side area information memory 2 is a nonvolatile storage medium, the parameter memory 21 may function as the main-body-side area information memory 2.

In the present embodiment, a plurality of detection areas are set or defined for each obstacle detection sensor 3. Each obstacle detection sensor 3 can select one of different detection areas as the target area for detection of any obstacle (or the target detection area for short) depending on the travel position and the stop position (position at which the ceiling transport vehicle V is stopped in order to vertically move the support mechanism 24) of the ceiling transport vehicle V. In other words, in the present embodiment, a plurality of mutually different detection areas are set or defined for each obstacle detection sensor 3. And the obstacle detection sensor 3 detects any obstacle with the detection area selected depending on the state of the article transport operation being the target area for detection of any obstacle (i.e., target detection area).

Figure 8:
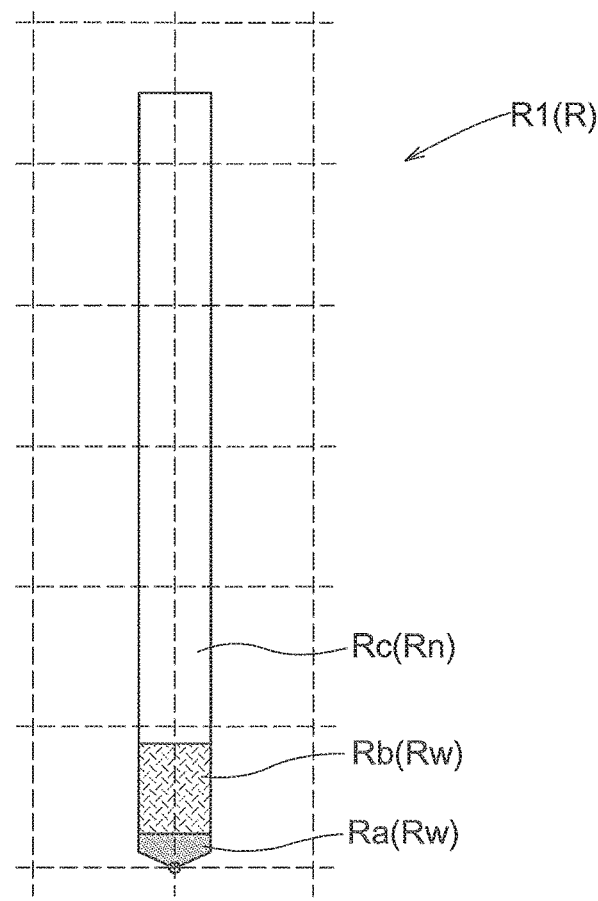
FIG. 8 shows an example of a detection area (first detection area)
Figure 9:
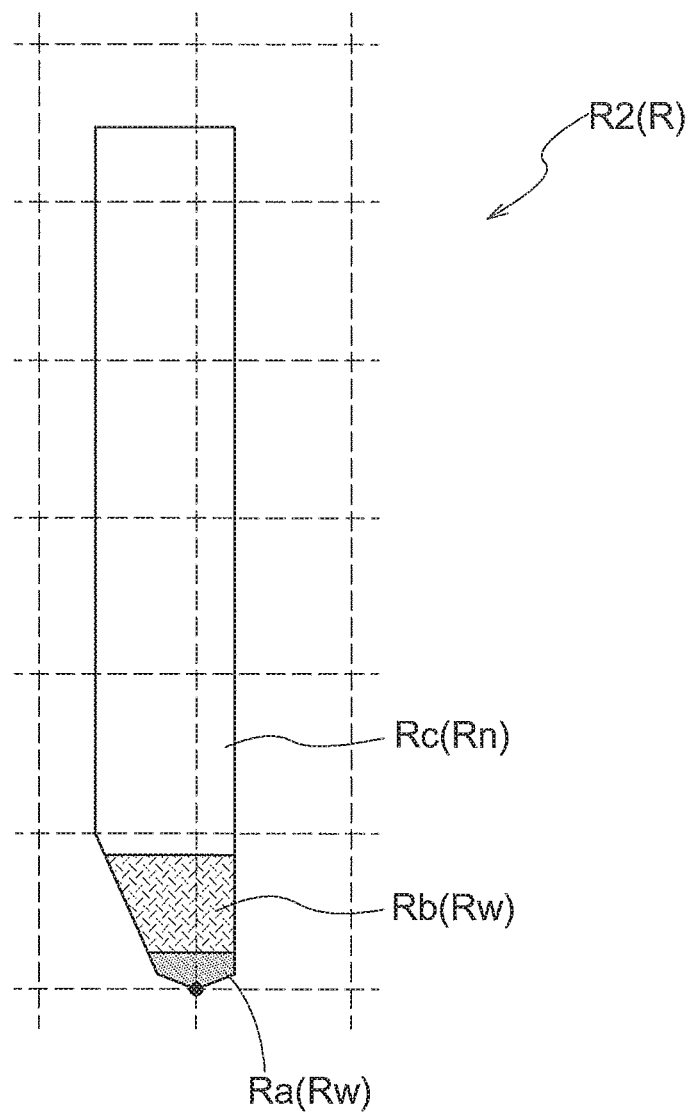
FIG. 9 shows an example of a detection area (second detection area)
Figure 10:
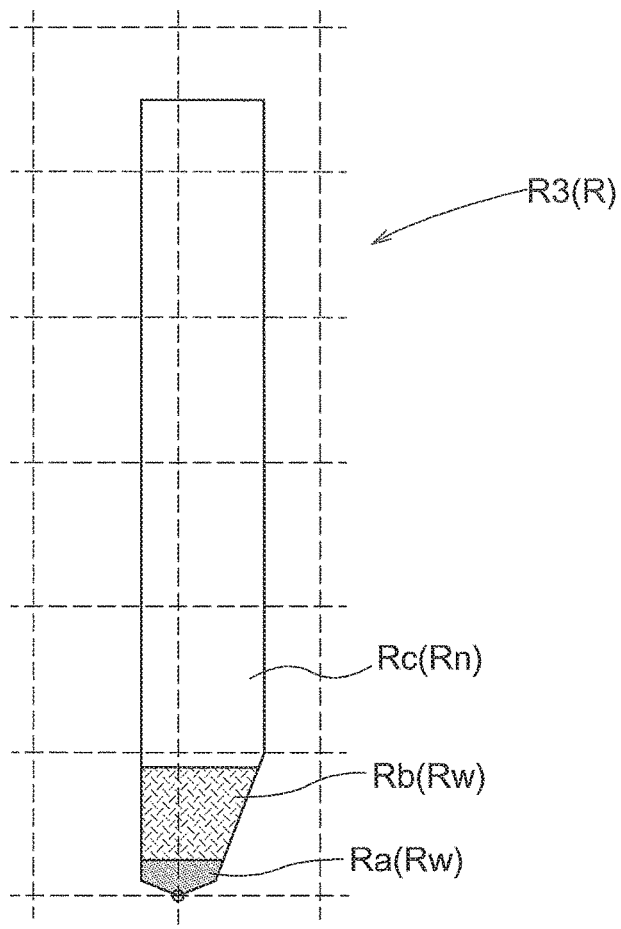
FIG. 10 shows an example of a detection area (third detection area)

The travel obstacle detection sensor 5 is described as an example of an obstacle detection sensor 3. FIGS. 8-14 show a plurality of different detection areas R. FIG. 8-FIG. 10 show the detection areas R each of which is an area that is forward of the vehicle V along the travel path L and that covers a relatively long distance along the travel direction Y is the target detection area. FIG. 8 shows a standard detection area R (first detection area R1) which is a target detection area that extends along a straight forward travel direction. The first detection area R1 is the detection area R that is selected when the ceiling transport vehicle V detects, for example, the coordinate markers M "B001" or "B003" shown in FIG. 4. In other words, the first detection area R1 is selected when traveling along a portion of the travel path L that is linear. The operational mode in which the obstacle detection sensor 3 (travel obstacle detection sensor 5) searches for an obstacle in the first detection area R1 is a standard straight forward monitoring mode.

FIG. 9 shows a detection area R (second detection area R2) which is a target detection area that is expanded to a greater degree (i.e., has a greater width) to the left along the lateral direction X compared to the area shown in FIG. 8. And FIG. 10 shows a detection area R (third detection area R3) which is a target detection area that is expanded to a greater degree (i.e., has a greater width) to the right (opposite from the direction for the area shown in FIG. 9) along the lateral direction X compared to the area shown in FIG. 8. The second detection area R2 and the third detection area R3 are selected at locations where attention needs to be paid also to areas to a side of the travel path L, such as when a processing device 102 or a support platform 103 is located to one side of the travel path L although the travel path L is linear. In contrast to the standard straight forward monitoring mode, the operational mode in which the obstacle detection sensor 3 (travel obstacle detection sensor 5) searches for an obstacle in the second detection area R2 is left-expanded straight forward monitoring mode whereas the operational mode in which the obstacle detection sensor 3 (travel obstacle detection sensor 5) searches for an obstacle in the third detection area R3 is a right-expanded straight forward monitoring mode.

Figure 11:
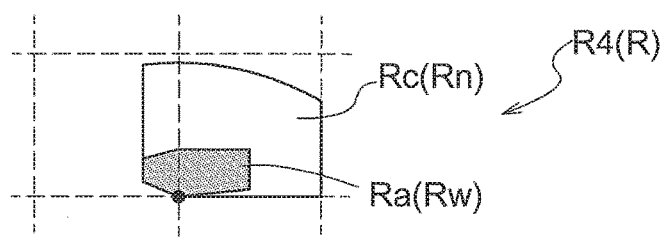
FIG. 11 shows an example of a detection area (fourth detection area)
Figure 12:
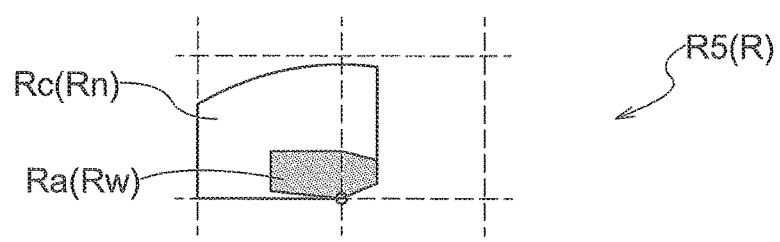
FIG. 12 shows an example of a detection area (fifth detection area)

FIGS. 11 and 12 show examples of the detection areas R selected when the travel path L curves (i.e., selected for a curved portion of the travel path L). FIG. 11 shows a detection area R which is used when the travel path L curves to the right or rightward and which is a fourth detection area R4 which is a target area that has a large area to the right (of center). FIG. 12 shows a fifth detection area R5 which is a detection area R used when the travel path L curves to the left or leftward and which is a target area that has a large area to the left (of center). The operational mode in which the obstacle detection sensor 3 (travel obstacle detection sensor 5) searches for an obstacle in the fourth detection area R4 is a rightward curve monitoring mode whereas the operational mode in which the obstacle detection sensor 3 (travel obstacle detection sensor 5) searches for an obstacle in the fifth detection area R5 is a leftward curve monitoring mode.

Figure 13:
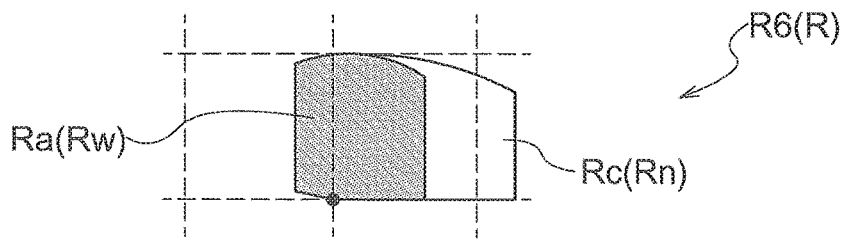
FIG. 13 shows an example of a detection area (sixth detection area)
Figure 14:
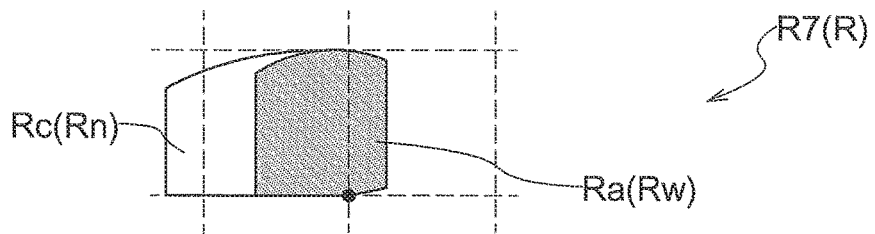
FIG. 14 shows an example of a detection area (seventh detection area)

FIGS. 13 and 14 show examples of the detection areas R that are used when a travel path L branches off from, or merges into, another travel path L. FIG. 13 shows a sixth detection area R6 which is a detection area R used when the ceiling transport vehicle V veers or turns to the right at a location where the travel path L branches off, or merges, to the right and which is a target area that has a larger area to the right (of center) than the fourth detection area R4. FIG. 14 shows a seventh detection area R6 which is a detection area R used when the ceiling transport vehicle V veers or turns to the left at a location where the travel path L branches off, or merges, to the left and which is a target area that has a larger area to the left (of center) than the fifth detection area R5. The operational mode in which the obstacle detection sensor 3 (travel obstacle detection sensor 5) searches for an obstacle in the sixth detection area R6 is a right-turn monitoring mode whereas the operational mode in which the obstacle detection sensor 3 (travel obstacle detection sensor 5) searches for an obstacle in the seventh detection area R7 is a left-turn monitoring mode. The fifth detection area R5 or the seventh detection area R7 is selected when the ceiling transport vehicle V detects, for example, the coordinate marker M "B002" shown in FIG. 4.

As shown in FIG. 8-FIG. 14, each detection area R is devided into a plurality of areas called divided areas (Rw, Rn). In other words, each detection area R includes at least two divided areas (Rw, Rn), into which the detection area R is divided, depending on the degree of relevance of the presence of an obstacle to an article transport operation by the ceiling transport vehicle V. The divided areas (Rw, Rn) include at least two areas, namely, a first divided area Rw which is associated with a relatively high degree of relevance, and a second divided area Rn (Rc) which is associated with a relatively low degree of relevance. As shown in FIGS. 8-10, the detection areas R may have (i.e. may be divided into) three or more divided areas (Ra, Rb, Rc). In the present embodiment, in each of the first detection area R1, the second detection area R2, and the third detection area R3 each of which has a long detecting range in the travel direction Y, the first divided area Rw is divided further into two divided areas (Ra, Rb) so that each has three divided areas (Ra, Rb, Rc). When the two divided areas Ra and Rb in the first divided area Rw need to be distinguished from each other, the area "Ra" will be referred to as the first primary divided area whereas the area "Rb" will be referred to as the first secondary divided area. Note that, in the present embodiment, the area "Rc" is identical to the second divided area Rn.

Thus, when there are three divided areas, three kinds of avoidance processes may be performed in response to a detection of an obstacle. For example, in addition to the reduced speed process and the vehicle stopping process, a low-speed-travel process and a vehicle decelerating and stopping process may be used. The low-speed-travel process is a process for causing the ceiling transport vehicle V to travel at a speed that is less than the speed in the reduced speed process. The vehicle decelerating and stopping process is a process for causing the ceiling transport vehicle V to travel at a low speed for a predetermined period of time and subsequently to come to a stop. The travel speed in the vehicle decelerating and stopping process is less than or equal to the travel speed during the reduced speed process. In addition, the amount of time in which to continue traveling at the low speed is shorter than a set avoidance period between the time an avoidance process is initiated and the time an error handling process is performed. For example, when there are three divided areas (Ra, Rb, Rc) provided, the transport vehicle controller 1 can perform an avoidance process as follows. The transport vehicle controller 1; performs a reduced speed process as an avoidance process if an obstacle is detected in the second divided area Rn (Rc); performs the vehicle decelerating and stopping process or the low-speed-travel process as an avoidance process if an obstacle is detected in the first secondary divided area Rb; and performs the vehicle stopping process as an avoidance process if an obstacle is detected in the first primary divided area Ra.

As shown in FIG. 7, the transport vehicle controller 1 transmits information on the travel position of the ceiling transport vehicle V (position information Sin) to a obstacle detection sensor 3 (travel obstacle detection sensor 5) based on, for example, a detection and reading of a coordinate marker M, etc. The sensor controller 31 retrieves detection area information (for example, information on the detection areas R1-R7) from the area information memory 32 using the position information Sin as an argument, and sets or selects a target detection area for the sensor portion 33. If an obstacle exists in the selected detection area R, the obstacle detection sensor 3 (travel obstacle detection sensor 5) outputs obstacle detection information Sout to the transport vehicle controller 1. In this process, the obstacle detection sensor 3 also adds to the obstacle detection information Sout, and outputs, information on which of the first divided area Rw and the second divided area Rn the obstacle was detected. For example, the obstacle detection information preferably includes detected position information that identifies the divided area (Rw, Rn) in which the obstacle is detected.

Figure 15:
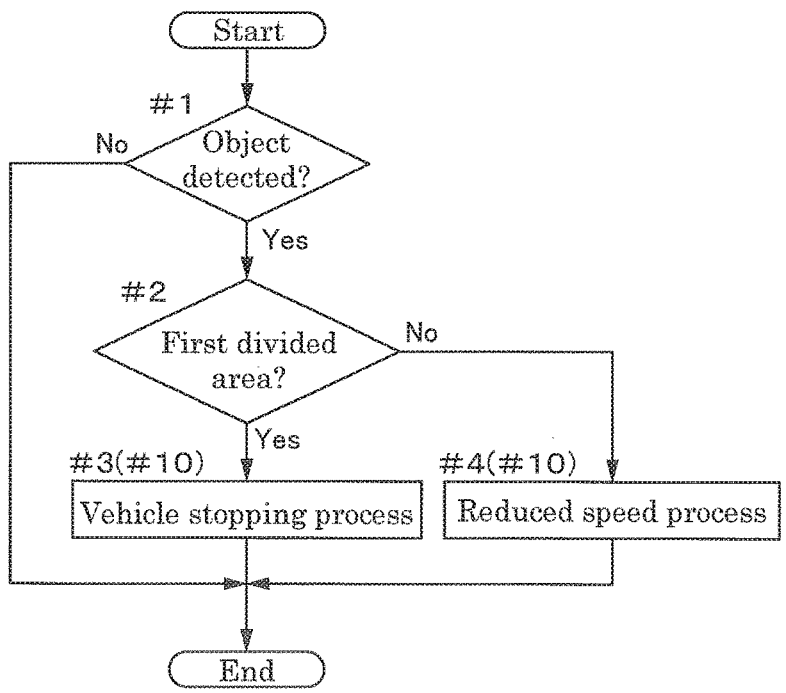
FIG. 15 is a flowchart showing an example of an avoidance process.

The transport vehicle controller 1 performs, based on the obstacle detection information Sout, an avoidance process which includes at least a reduced speed process for reducing the travel speed of the ceiling transport vehicle V. In the present embodiment, the transport vehicle controller 1 performs a reduced speed process as an avoidance process if an obstacle is detected in the second divided area Rn, and performs the vehicle stopping process for stopping the ceiling transport vehicle V if an obstacle is detected in the first divided area Rw. As shown in the flowchart of FIG. 15, the transport vehicle controller 1 determines whether or not an obstacle is detected based on the obstacle detection information Sout (#1). If the obstacle was detected, the transport vehicle controller 1 determines whether or not the detected position of an obstacle is in the first divided area Rw based on the obstacle detection information Sout (#2). If the detected position of the obstacle is in the first divided area Rw, the transport vehicle controller 1 performs the vehicle stopping process (#3) as the avoidance process (#10). If the detected position of the obstacle is not in the first divided area Rw, the transport vehicle controller 1 performs a reduced speed process (#4) as the avoidance process (#10).

As described above with reference to FIG. 3, the ceiling transport vehicle V is provided with a display 7 which can visually present operation information that indicates the state of control of the ceiling transport vehicle V by the transport vehicle controller 1. When the transport vehicle controller 1 performs an avoidance process, the operation information includes avoidance process information which includes at least information that identifies the detection area R in which the obstacle is detected at the time of the detection by the obstacle detection sensor 3. The avoidance process information preferably includes the detected position information that identifies the divided area (Rw, Rn) in which the obstacle is detected. The transport vehicle controller 1 preferably causes the avoidance process information to be displayed on the display 7 if the transport vehicle controller 1 performs at least the vehicle stopping process among the various avoidance processes. Naturally, the avoidance process information may be caused to be displayed "manually" also when the reduced speed process is performed, based on an instruction provided by a worker (for example, through transmission of a command using a mobile control unit or terminal, etc., which can communicate with the transport vehicle controller 1 in the ceiling transport vehicle V). In addition, the transport vehicle controller 1 may naturally cause the avoidance process information to be displayed on the display 7 in different situations including when the reduced speed process is performed.

Figure 16:
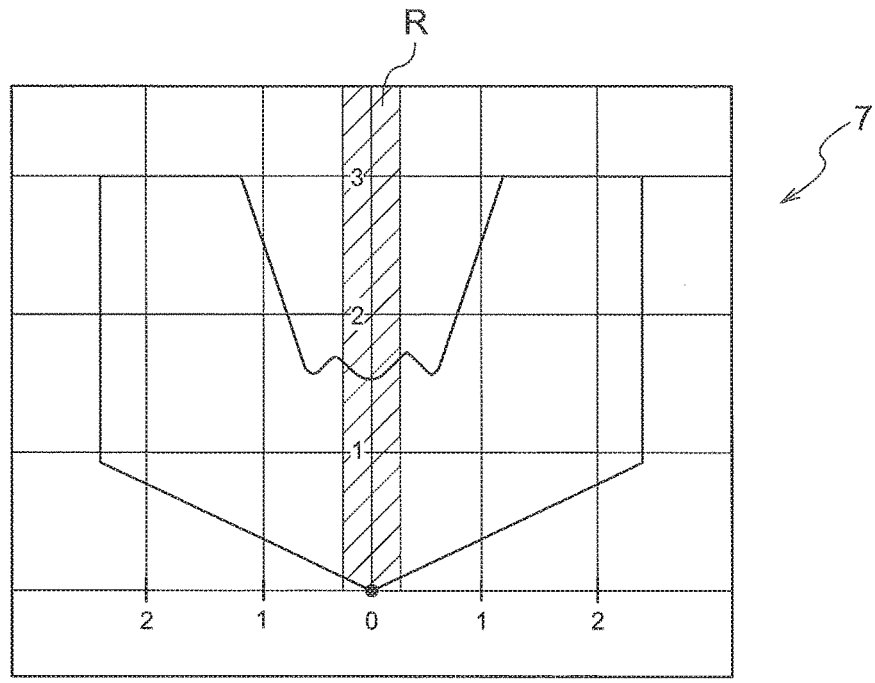
FIG. 16 shows an example of an image on a display.

FIG. 16 shows an example of an image on the display 7. Distance scales with the position of the obstacle detection sensor 3 at its origin are displayed on the display 7. In addition, when a number of different kinds (4, 5, 6) of obstacle detection sensors 3 are present as in the present embodiment, a different background is displayed so as to allow the kind of each sensor to be identified. FIG. 16 shows an example in which a background that symbolically represents the travel path L that is in the target detection area is displayed for the travel obstacle detection sensor 5. It is preferable that a background that symbolically represents the floor surface and/or the support platform 103 is displayed in the case of the transfer obstacle detection sensor 6, and that a background that symbolically represents a preceding vehicle (ceiling transport vehicle V) is displayed in the case of the rear-end collision prevention sensor 4. The detection area R at the time of the detection of the object and the detected position of the obstacle are also displayed on the display 7. The worker can make a determination as to under what detection condition and at what position the obstacle was detected.

The obstacle detection sensors 3 may detect, as obstacles, objects that are not actually obstacles, for example, a wall surface, and objects near a travel path L, etc., because of changes in the operation conditions of the article transport facility 100 such as alteration of the layout of the factory, and moving of objects installed near the travel path L, etc. Because the detection area R at the time of the detection of the object and the detected position of the obstacle are also displayed on the display 7, a worker can determine properly that an object that is not an obstacle was detected as an obstacle. And the worker can quickly take a responsive action such as making appropriate changes in the detection area information, etc. And because such changes in the detection area information can be made in a short period of time in the present embodiment, occurrences of the obstacle detection sensor 3 repeating the same misdetection at the same location can be reduced.

Note that an example embodiment is described above in which the obstacle detection sensor 3 outputs the detection area information at the time of detecting an obstacle together with the obstacle detection information. However, when a parameter memory 21 that is a nonvolatile storage medium functions as the main-body-side area information memory 2, the detection area information does not necessarily need to be outputted together with the obstacle detection information. As described above, the position information Sin of the ceiling transport vehicle V is outputted to the obstacle detection sensor 3 from the transport vehicle controller 1. And the obstacle detection sensor 3 retrieves, or reads in, the corresponding detection area information from the area information memory 32 using the position information Sin as an argument and set the detection area information for the sensor portion 33. Similarly, it is possible for the transport vehicle controller 1 to retrieve, or read in, detection area information from the main-body-side area information memory 2, using, as the argument, the position information Sin or information on a coordinate marker M which is the source of the position information Sin, etc. Therefore, in such a case, detection area information does not necessarily need to be outputted together with the obstacle detection information.

Incidentally, the area information stored in the area information memory 32 of the obstacle detection sensor 3 may not be accurate, for example, when a failure occurs during the transmission of the data from the transport vehicle controller 1 to the obstacle detection sensor 3, or when a corruption of data, etc. occurs in the area information memory 32 of the obstacle detection sensor 3. When the main-body-side area information memory 2 is a nonvolatile storage medium as described above, It is preferable that the transport vehicle controller 1 checks, upon the power up of the ceiling transport vehicle V, whether the detection area information stored in the main-body-side area information memory 2 matches, or in agreement with, the detection area information stored in the area information memory 32. And it is preferable that, in the event that they do not match, or are in disagreement, the transport vehicle controller 1 transmits the detection area information stored in the main-body-side area information memory 2 to the obstacle detection sensor 3.

Figure 17:
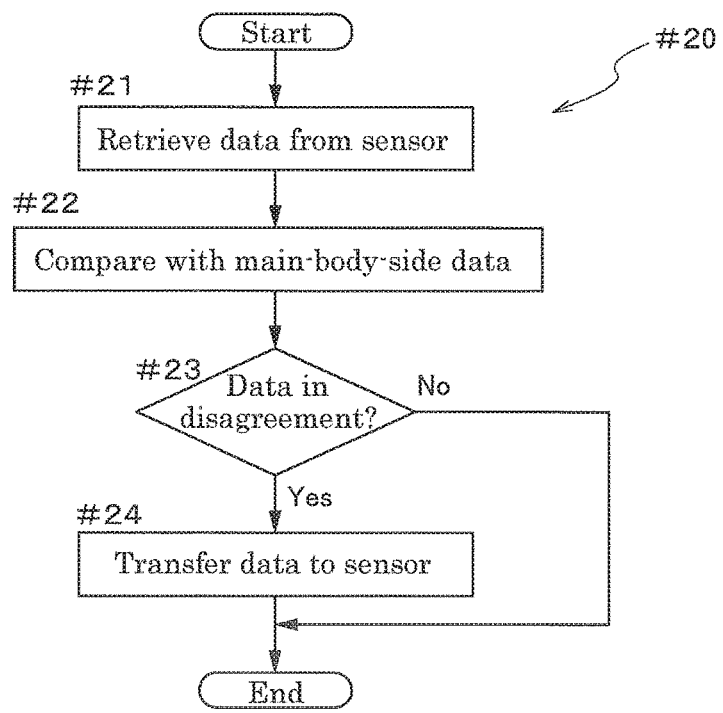
FIG. 17 shows an example of a verification process.

For example, it is preferable that, as shown in the flowchart of FIG. 17, such a verification process is performed as one of the initialization processes after the power up. First, the transport vehicle controller 1 reads in or retrieves detection area information from the obstacle detection sensor 3 (#21). Next, the retrieved detection area information is compared with the data (main-body-side data) in the main-body-side area information memory 2 (#22). When two data do not match, i.e., are in disagreement (#23; yes), main-body-side data is transmitted to the obstacle detection sensor 3 (#24). This allows the detection area information stored by the area information memory 32 to be verified after the power up of the ceiling transport vehicle V and before any article transport operation is performed. And when the detection area information is not accurate, the detection area information stored in the main-body-side area information memory 2 is stored in the area information memory 32. This arrangement allows the ceiling transport vehicle V to perform article transport operations using proper and accurate detection area information. Note that it is preferable that this verification process is also performed immediately after the detection area information for updating, provided by the transport facility controller H, is transmitted to the obstacle detection sensor 3.

Other Embodiments

Other embodiments are described next. Note that any arrangement and feature of each embodiment described below does not have to be used or incorporated by itself but may be combined with any arrangement and feature of any other embodiment as long as such combination does not give rise to a contradiction.

(1) In the description above, an example is described in which each article transport vehicle is a ceiling or overhead transport vehicle V. However, the article transport vehicle is not limited to a ceiling transport vehicle V as long as the vehicle travels along a track, i.e., along a set travel path or paths L. An article transport vehicle may be one that travels on a rail installed on the floor surface, for example.

(2) In the description above, an example embodiment is described in which a plurality of different detection areas R are set for each obstacle detection sensors 3. However, one detection area R may be set for each obstacle detection sensor 3. As long as the detection areas R can be changed and set, the issues that are related to such changing are identical to those discussed in the present disclosure. Thus, changes and setting of the obstacle detection sensors 3 mounted in each of a plurality of article transport vehicles can be made efficiently if the transport vehicle controller 1 of each article transport vehicle (ceiling transport vehicle V) receives the detection area information transmitted at once from the transport facility controller H and if each obstacle detection sensor 3 to which the information is transmitted stores the information in the area information memory 32.

(3) In the description above, an example embodiment is described in which, if an obstacle detection sensor 3 detects an obstacle, the transport vehicle controller 1 performs an avoidance process and causes the operation information which includes avoidance process information to be displayed on the display 7. However, the transport vehicle controller 1 may perform only an avoidance process when an obstacle detection sensor 3 detects an obstacle, without the presentation of any information on the display 7.

(4) In the description above, an example embodiment is described in which the operation information including avoidance process information is displayed on the display 7 if the transport vehicle controller 1 performs an avoidance process. However, the invention is not limited to such an embodiment. When an error handling process is performed after the set avoidance period elapses from the time the transport vehicle controller 1 initiates an avoidance process, the avoidance process information and error handling process information, or operation information including error handling process information may be displayed on the display 7.

Summary of Embodiments

An article transport facility of the present embodiment is an article transport facility including a plurality of article transport vehicles, each of which is configured to travel along a track and to transport an article by performing an article transport operation for transporting an article, the article transport facility comprises a transport facility controller configured to cause each of the plurality of article transport vehicles to perform an article transport operation by providing a transport command to each of the plurality of article transport vehicles through wireless communication.

Each of the plurality of article transport vehicles includes: at least one obstacle detection sensor, each configured to detect an obstacle that exists in at least one detection area defined in a peripheral area of the article transport vehicle, and a transport vehicle controller configured to perform an autonomous control of the article transport operation based on the transport command.

Each of the at least one obstacle detection sensor includes an area information memory for storing detection area information on the at least one detection area, The transport vehicle controller is configured to receive the detection area information from the transport facility controller through wireless communication, and to transmit the received detection area information to at least one of the at least one obstacle detection sensor.

The at least one obstacle detection sensor is configured to cause the area information memory to store the transmitted detection area information.

With the arrangement discussed above, the transport facility controller can transmit new detection area information collectively to the plurality of article transport vehicles. New detection area information is transmitted from the transport vehicle controller of each article transport vehicle to each of the at least one obstacle detection sensor provided to each article transport vehicle. And each of the at least one obstacle detection sensor can store that information in its area information memory. Because this makes it possible to update the detection area information in the article transport vehicles in parallel, amount of time required to set the detection conditions for all the sensors would not be significant even when the article transport facility has many article transport vehicles. In other words, with the arrangement described above, the detection condition of at least one obstacle detection sensor mounted in each of a plurality of article transport vehicles can be set efficiently.

Here, a plurality of detection areas which are mutually different are preferably defined for each of the at least one obstacle detection sensor, and wherein each of the at least one obstacle detection sensor is preferably configured to detect an obstacle with one of the plurality of detection areas, that is selected depending on a state of the article transport operation, being a target detection area.

The track along which an article transport vehicle travels may not be a single straight path but may branch off to a number of paths. Or a number of tracks may merge into a single path. And a track may have a curved portion, or a turn. Therefore, the target detection area in which any obstacle needs to be detected differs depending on the position along the track on which the article transport vehicle exists. In addition, when the article transport operation also includes a transferring operation of an article from or to the article transport vehicle at the transport origin or the transport destination, the presence of any obstacle needs to be detected by an obstacle detection sensor at the time of the transfer. At the time of this transfer, the target detection area in which presence of an obstacle needs to be detected may differ depending on the movement during the transfer operation. Thus, it is preferable to have a plurality of detection areas which are mutually different are defined for each of the at least one obstacle detection sensor so that the target detection area can be selected depending on the state of the article transport operation.

Here, each of the at least one obstacle detection sensor is preferably configured to output obstacle detection information if an obstacle is detected, wherein the transport vehicle controller is configured to perform an avoidance process which includes at least a reduced speed process for causing the article transport vehicle to travel at a reduced travel speed based on the obstacle detection information, wherein the article transport vehicle is preferably provided with a display which is capable of visually presenting operation information which indicates a state of control of the article transport vehicle by the transport vehicle controller, and wherein if the transport vehicle controller performs the avoidance process, the transport vehicle controller preferably includes, in the operation information, an avoidance process information which includes at least information that identifies one of the plurality of detection areas that has been selected at a time of a detection of an obstacle by the at least one obstacle detection sensor.

With the arrangement described above, the transport vehicle controller performs an avoidance process based on the result of detection by an obstacle detection sensor; thus, when an obstacle actually exists, an incident of the article transport vehicle and/or the article being transported coming into contact the obstacle can be made less likely or prevented. In addition, since the avoidance process information is reported through a display when the avoidance process is performed, the fact that an avoidance process is performed and the reason for it can be reported properly to a worker (operator) t of an article transport facility. The worker can then remove the obstacle, for example, if the worker can confirm the presence of the obstacle. And if the worker cannot confirm the presence of any obstacle, the worker may determine that the obstacle detection sensor may have made an overly-sensitive detection, and may decide to, for example, make appropriate changes in the detection area information.

Here, each of the plurality of detection areas preferably include at least two divided areas which are divided depending on a degree of relevance of a presence of an obstacle to the article transport operation by the article transport vehicle, wherein the at least two divided areas preferably include a first divided area which is associated with a relatively high degree of relevance and a second divided area which is associated with a relatively low degree of relevance, wherein the transport vehicle controller preferably performs, as the avoidance process, the reduced speed process if an obstacle is detected in the second divided area, wherein the transport vehicle controller preferably performs, as the avoidance process, a vehicle stopping process for stopping the article transport vehicle if an obstacle is detected in the first divided area, wherein the obstacle detection information preferably includes detected position information that can be used to identify one of the at least two divided areas in which the obstacle has been detected, and wherein the avoidance process information preferably includes the detected position information.

The avoidance process can be the reduced speed process or the vehicle stopping process; thus, when the degree of relevance of the presence of an obstacle to an article transport operation is relatively low, the article transport vehicle may be, for example, allowed to continue with the article transport operation only with its travel speed reduced, and without stopping the article transport vehicle. In other words, an obstacle detection sensor may sometimes make an overly-sensitive detection. And even in such a situation, the article transport operation can be continued with higher likelihood, which can help reduce the incidents of lowered operating efficiency of the article transport facility. In addition, since the detected position information is included in the avoidance process information, a worker in the transport facility can make an appropriate determination as to the presence of the obstacle to which the obstacle detection sensor responded and as to the relevance and effect of the presence obstacle if it actually exists. When the worker is able to confirm the presence of the obstacle that may be relevant to the article transport operation, for example, the worker can remove the obstacle in question. In addition, in case the presence of any obstacle cannot be confirmed or it can be determined that the presence of the obstacle would not have any relevance to the article transport operation, the worker may consider the possibility of making changes in the determination area information to reduce or prevent the overly-sensitive detection by the obstacle detection sensor.

In addition, the display preferably displays the avoidance process information at least when the transport vehicle controller performs the vehicle stopping process, among different avoidance processes.

Since the article transport vehicle may be traveling, or transferring, etc., during a reduced speed process, it may be difficult for a worker to view and check the display during the reduced speed process. In addition, during the reduced speed process, the article transport vehicle is traveling at a reduced speed but the article transport operation is still continuing; thus, the priority of identifying the cause of avoidance process is low. On the other hand, since the article transport operation such as the traveling and the transferring, etc. is also stopped in the vehicle stopping process, identifying the cause of the avoidance process needs to be prioritized. Therefore, as in the arrangement described above, if the avoidance process information is displayed at least when the transport vehicle controller performs the vehicle stopping process, a worker can check the cause of the avoidance process quickly and is thus preferable.

In addition, the at least one obstacle detection sensor preferably outputs the detection area information at the time of the detection of the obstacle, together with the obstacle detection information.

With the arrangement described above, the obstacle detection information and detection area information are outputted in correlation with each other; thus, the detection area information can be properly added to the avoidance process information included in the operation information used by the display.

In addition, the transport vehicle controller is preferably provided with a main-body-side area information memory for storing the detection area information received from the transport facility controller through wireless communication.

With the arrangement described above, the transport vehicle controller which receives the obstacle detection information from an obstacle detection sensor can also identify the detection area information that corresponds to the obstacle detection information. Therefore, even if the obstacle detection sensor is not arranged to output the detection area information together with the obstacle detection information, the detection area information can be properly included in the avoidance process information.

In addition, if the transport vehicle controller is provided with a main-body-side area information memory for storing the detection area information received from the transport facility controller through wireless communication, the transport vehicle controller is preferably configured to check, at a time of a power up of the article transport vehicle, whether or not the detection area information stored in the main-body-side area information memory is in agreement with the detection area information stored in the area information memory, and to, when not in agreement, transmit the detection area information stored in the main-body-side area information memory to the at least one obstacle detection sensor.

The area information stored in the area information memory of an obstacle detection sensor may not be accurate, for example, when a failure occurs during the transmission of the data from the transport vehicle controller to the obstacle detection sensor, or when a corruption of data, etc. occurs in the area information memory of the obstacle detection sensor. With the arrangement described above, at a time of a power up of the article transport vehicle and before any article transport operation is started, the detection area information stored in the area information memory is checked. And when the detection area information is found to be inaccurate, the detection area information stored in the main-body-side area information memory is stored in the area information memory. This allows the article transport vehicle to perform an article transport operation using a proper and accurate detection area information.

What is claimed is:

1. An article transport facility including a plurality of article transport vehicles, each of which is configured to travel along a track and to transport an article by performing an article transport operation for transporting the article, the article transport facility comprising:

a transport facility controller configured to cause each of the plurality of article transport vehicles to perform an article transport operation by providing a transport command to each of the plurality of article transport vehicles through wireless communication;

wherein each of the plurality of article transport vehicles includes:

at least one obstacle detection sensor, each configured to detect an obstacle that exists in at least one detection area defined in a peripheral area of the article transport vehicle; and a transport vehicle controller configured to perform an autonomous control of the article transport operation based on the transport command;

wherein each of the at least one obstacle detection sensor includes an area information memory for storing detection area information on the at least one detection area, wherein the transport vehicle controller is configured to receive the detection area information from the transport facility controller through wireless communication, and to transmit the received detection area information to at least one of the at least one obstacle detection sensor, and wherein the at least one obstacle detection sensor is configured to cause the area information memory to store the transmitted detection area information.

2. The article transport facility as defined in claim 1, wherein a plurality of detection areas which are mutually different are defined for each of the at least one obstacle detection sensor, and wherein each of the at least one obstacle detection sensor is configured to detect an obstacle with one of the plurality of detection areas, that is selected depending on a state of the article transport operation, being a target detection area.

3. The article transport facility as defined in claim 2, wherein each of the at least one obstacle detection sensor is configured to output obstacle detection information if an obstacle is detected, wherein the transport vehicle controller is configured to perform an avoidance process which includes at least a reduced speed process for causing the article transport vehicle to travel at a reduced travel speed based on the obstacle detection information, wherein the article transport vehicle is provided with a display which is capable of visually presenting operation information which indicates a state of control of the article transport vehicle by the transport vehicle controller, and wherein, if the transport vehicle controller performs the avoidance process, the transport vehicle controller includes, in the operation information, an avoidance process information which includes at least information that identifies one of the plurality of detection areas that has been selected at a time of a detection of an obstacle by the at least one obstacle detection sensor.

4. The article transport facility as defined in claim 3, wherein each of the plurality of detection areas include at least two divided areas which are divided depending on a degree of relevance of a presence of an obstacle to the article transport operation by the article transport vehicle, wherein the at least two divided areas include a first divided area which is associated with a relatively high degree of relevance and a second divided area which is associated with a relatively low degree of relevance, wherein the transport vehicle controller performs, as the avoidance process, the reduced speed process if an obstacle is detected in the second divided area, wherein the transport vehicle controller performs, as the avoidance process, a vehicle stopping process for stopping the article transport vehicle if an obstacle is detected in the first divided area, wherein the obstacle detection information includes detected position information that can be used to identify one of the at least two divided areas in which the obstacle has been detected, and wherein the avoidance process information includes the detected position information.

5. The article transport facility as defined in claim 4, wherein the display displays the avoidance process information at least when the transport vehicle controller performs the vehicle stopping process among different avoidance processes.

6. The article transport facility as defined in claim 3, wherein the at least one obstacle detection sensor outputs the detection area information at the time of the detection of the obstacle, together with the obstacle detection information.

7. The article transport facility as defined in claim 1, wherein the transport vehicle controller is provided with a main-body-side area information memory for storing the detection area information received from the transport facility controller through wireless communication.

8. The article transport facility as defined in claim 7, wherein the transport vehicle controller is configured to check, at a time of a power up of the article transport vehicle, whether or not the detection area information stored in the main-body-side area information memory is in agreement with the detection area information stored in the area information memory, and to, when not in agreement, transmit the detection area information stored in the main-body-side area information memory to the at least one obstacle detection sensor.

\* \* \* \* \*